(12) United States Patent
Suggs

(10) Patent No.: US 8,570,304 B2
(45) Date of Patent: Oct. 29, 2013

(54) DETERMINING TOUCH LOCATIONS USING DISTURBED LIGHT

(75) Inventor: Bradley N. Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 13/057,277

(22) PCT Filed: Sep. 26, 2008

(86) PCT No.: PCT/US2008/077899
§ 371 (c)(1),
(2), (4) Date: Feb. 2, 2011

(87) PCT Pub. No.: WO2010/036262
PCT Pub. Date: Apr. 1, 2010

(65) Prior Publication Data
US 2011/0141064 A1    Jun. 16, 2011

(51) Int. Cl.
*G06F 3/042* (2006.01)
*G02B 27/10* (2006.01)

(52) U.S. Cl.
USPC .......................................... 345/175; 359/618

(58) Field of Classification Search
USPC .......................................................... 345/175
See application file for complete search history.

(56) References Cited

U.S. PATENT DOCUMENTS

| | | | |
|---|---|---|---|
| 6,597,508 B2 * | 7/2003 | Seino et al. ............... | 359/618 |
| 6,972,753 B1 | 12/2005 | Kimura et al. | |
| 7,142,197 B2 * | 11/2006 | Wang et al. ............... | 345/179 |
| 7,205,964 B1 * | 4/2007 | Yokoyama et al. ........ | 345/76 |
| 7,394,058 B2 | 7/2008 | Chua et al. | |
| 7,852,325 B2 * | 12/2010 | Fu et al. .................... | 345/174 |
| 2006/0279558 A1 | 12/2006 | Van Delden et al. | |
| 2007/0200835 A1 | 8/2007 | Choo et al. | |
| 2008/0011944 A1 | 1/2008 | Chua | |
| 2009/0237375 A1 * | 9/2009 | Khan et al. ............... | 345/175 |

FOREIGN PATENT DOCUMENTS

| | | |
|---|---|---|
| CN | 1536527 | 10/2004 |
| CN | 2773799 Y | 4/2006 |
| CN | 1776586 | 5/2006 |
| CN | 101206550 A | 6/2008 |

OTHER PUBLICATIONS

Microsoft Corporation, Microsoft Surface, http://www.microsoft.com/surface/index.html, downloaded Sep. 26, 2008.

(Continued)

*Primary Examiner* — Charles V Hicks

(57) ABSTRACT

A system comprises a plurality of light sources configured to provide light beams to a waveguide layer of a touch-screen. At least one of the light beams is disturbed when an object touches the touch-screen at a touch point. The system also comprises a plurality of detectors, where at least one of the detectors is configured to detect the disturbed light. The system comprises control logic coupled to the at least one detector. The control logic determines a location of the touch point as a result of the at least one detector detecting the disturbed light. The plurality of light sources and plurality of detectors are contained within a source/detector layer. The source/detector layer is separated from the waveguide layer by a mirror layer comprising a plurality of mirrors that transfer light between the source/detector layer and the waveguide layer.

25 Claims, 7 Drawing Sheets

(56) References Cited

OTHER PUBLICATIONS

Microsoft Corporation, Windows Driver Kit: Human input Devices HIDClass Devices, http://msdn.microsoft.com/en-us/library/ms789872(printer).aspx, downloaded Sep. 26, 2008.

NextWindow Touch Screen Technology—Benefits, http://www.nextwindow.com/benefits/index.html, downloaded Sep. 26, 2008.

Steve Hotelling, et al., Multipoint Touchscreen, U.S. Appl. No. 10/840,862, filed May 6, 2004, PCT/US05/014364 filed Apr. 26, 2005.

WIPO, International Search Report dated Jun. 22, 2009, PCT/US2008/077899 filed Sep. 26, 2008.

* cited by examiner

DETERMINING TOUCH LOCATIONS USING DISTURBED LIGHT

BACKGROUND

Various types of computers use touch screens to receive input from end-users. Generally, an end-user uses a finger or other instrument to make physical contact with the touch screen. The computer coupled to the touch screen detects the physical contact and reacts accordingly. While touch screens generally are adapted to detect input from a single finger or other instrument, they are often unable to properly detect and process simultaneous input from multiple such instruments. Further, touch screens require behind-screen circuitry that consumes an undesirably large amount of space.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
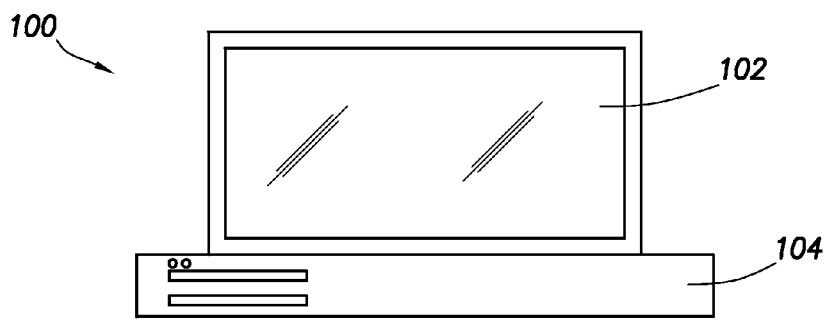
FIG. 1 shows an illustrative touch-screen desktop computer system, in accordance with embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "adjacent" may mean "next to" or "near." For example, if component B is located between components A and C, component C may be described as adjacent to both components A and B.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a touch screen system that is capable of detecting multiple, simultaneous touches. The system comprises multiple, adjacent layers: a glass (or "waveguide") layer, a light source/detector layer and a mirror layer in between the glass and source/detector layers. The source/detector layer comprises multiple light sources disposed along one side of the layer and multiple light detectors disposed along a different side (e.g., adjacent and not opposite) side of the layer. The mirror layer comprises a plurality of mirrors. Each mirror is adjacent to a different light source or detector of the source/detector layer. Light emitted from a light source is reflected off of a mirror in the mirror layer and enters into the glass layer. Light exiting the glass layer is reflected off of a mirror in the mirror layer and is detected by a light detector in the source/detector layer. Because the light sources and detectors are located "behind" the glass layer instead of along a perimeter of the glass layer, space is conserved.

In operation, the light sources are activated in a rapid-fire, daisy-chain sequence. In the period of time during which each light source is activated, each of the light detectors is also activated in a rapid-fire, daisy-chain sequence. This light emission/detection sequence essentially forms a "grid" that quickly and repeatedly "scans" the touch screen for touches. Thus, for example, when a finger touches the touch screen at location "A," the light source aligned with location A emits light before the finger can be removed from the touch screen. The finger disperses the light, and the light detector aligned with location A detects the dispersed light. The touch screen determines the point at which the light source that emitted the light and the light detector that detected the dispersed light "intersect." This intersection point is determined to be the touch location. The same technique can be used for any number of simultaneous touches. Various embodiments of this technique are now described.

FIG. 1 shows an illustrative computer system 100. The computer system 100 comprises a display 102 and a chassis 104, which houses various computer components, including processors, memory, video cards, etc. In at least some embodiments, the display 102 comprises a touch-screen display. In some such embodiments, the display 102 is a primary input device such that a keyboard, mouse, etc. are unnecessary. In embodiments where the display 102 comprises a touch-screen display, the display 102 may be receptive to any type of stimulus, including human touch, styluses, etc. Although the computer system 100 is shown in FIG. 1 as a desktop computer, variations of the computer system 100 may include notebook computers, personal digital assistants (PDAs), portable music players, mobile phones, televisions, etc. The techniques disclosed herein may be implemented in some or all such devices.

Figure 2:
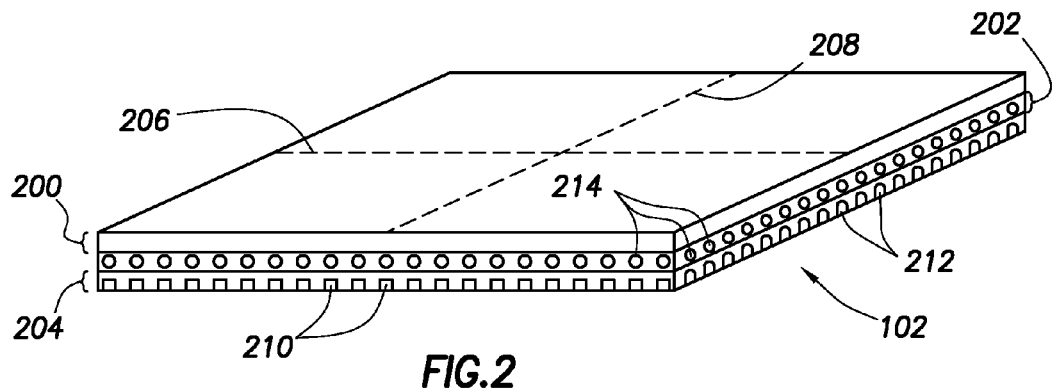
FIG. 2 shows a three-dimensional view of the touch-screen display in the system of FIG. 1, in accordance with embodiments.

FIG. 2 shows a detailed, three-dimensional view of the display 102 of FIG. 1. The display 102 comprises multiple layers. Specifically, the display 102 comprises a glass layer 200, a mirror layer 202 adjacent to the glass layer 200, and a light source/detector layer (LSDL) 204 adjacent to the glass layer 200 and the mirror layer 202. Also adjacent to the glass layer 200 is a display surface, such as a liquid crystal display or plasma display (shown in FIGS. 3-4). The glass layer 200, also referred to as a "touch screen" or "waveguide layer," comprises any suitable type of glass capable of guiding light (e.g., light from a predetermined light wavelength band) through the glass layer 200. In at least some embodiments, the glass layer 200 guides light using the technique known as total internal reflection without undue absorption.

The LSDL 204 comprises a plurality of light sources 212 (e.g., infrared laser diodes) arranged along one side (e.g., edge) of the LSDL 204 and a plurality of detectors 210 arranged along another side of the LSDL 204. Although the light sources 212 and the detectors 210 may be arranged on any of the sides of the LSDL 204 as desired, in at least some embodiments, the light sources 212 are all disposed on a common side of the LSDL 204 and the detectors 210 are all disposed on another common side of the LSDL 204. Further, in some embodiments, the side(s) of the LSDL 204 comprising the light sources 212 is/are substantially orthogonal to the side(s) of the LSDL 204 comprising the detectors 210. The light sources 212 may comprise, for example, infrared light emitting diodes, infrared laser diodes, etc. The detectors 210 may comprise any suitable type of light detector, such as complementary metal-oxide semiconductor (CMOS) sensors.

The mirror layer 202, which abuts or at least is adjacent to the glass layer 200 and the LSDL 204, comprises a plurality of mirror pairs 214. In some embodiments, the total number of mirror pairs 214 matches the total number of detectors 210 and light sources 212, with one mirror pair for each detector 210 or light source 212. The mirror pairs 214 may be arranged as necessary in the mirror layer 202 to achieve proper introduction of light into, and the proper extraction of light out of, the glass layer 200. However, in at least some embodiments, each mirror pair 214 is disposed directly above (e.g., closer to the glass layer 200) a detector 210 or light source 212. In some embodiments, a single pair of substantially cylindrical mirrors may be used to facilitate light extraction from, or the introduction of light into, the glass layer 200 for multiple detectors or light sources along a single side of the display 102. Stated in another way, in such embodiments, a single pair of cylindrical mirrors may span the length of mirror layer 202, thereby servicing some or all of the light sources 212. Similarly, another pair of cylindrical mirrors may span the width of the mirror layer 202, thereby servicing some or all of the detectors 210. In some such embodiments, baffling may be disposed between mirrors in a single pair to mitigate light stray.

Because the display 102 comprises a touch-screen, and further because the detectors 210, light sources 212 and mirror pairs 214 are used to detect touches (e.g., human fingers, styluses) as described below, spacing between each of the detectors, each of the light sources and each of the mirror pairs may be roughly equivalent to a width and/or length of the average human fingertip (e.g., a minimum of between 0.01 mm-10 mm). In other embodiments, the spacing between each of the detectors, between each of the light sources and/or between each of the mirrors may be roughly equivalent to a width of a stylus tip (e.g., a minimum of between 0.25-2 mm) that is manufactured for use with the display 102. Other widths also may be used.

Figure 6:
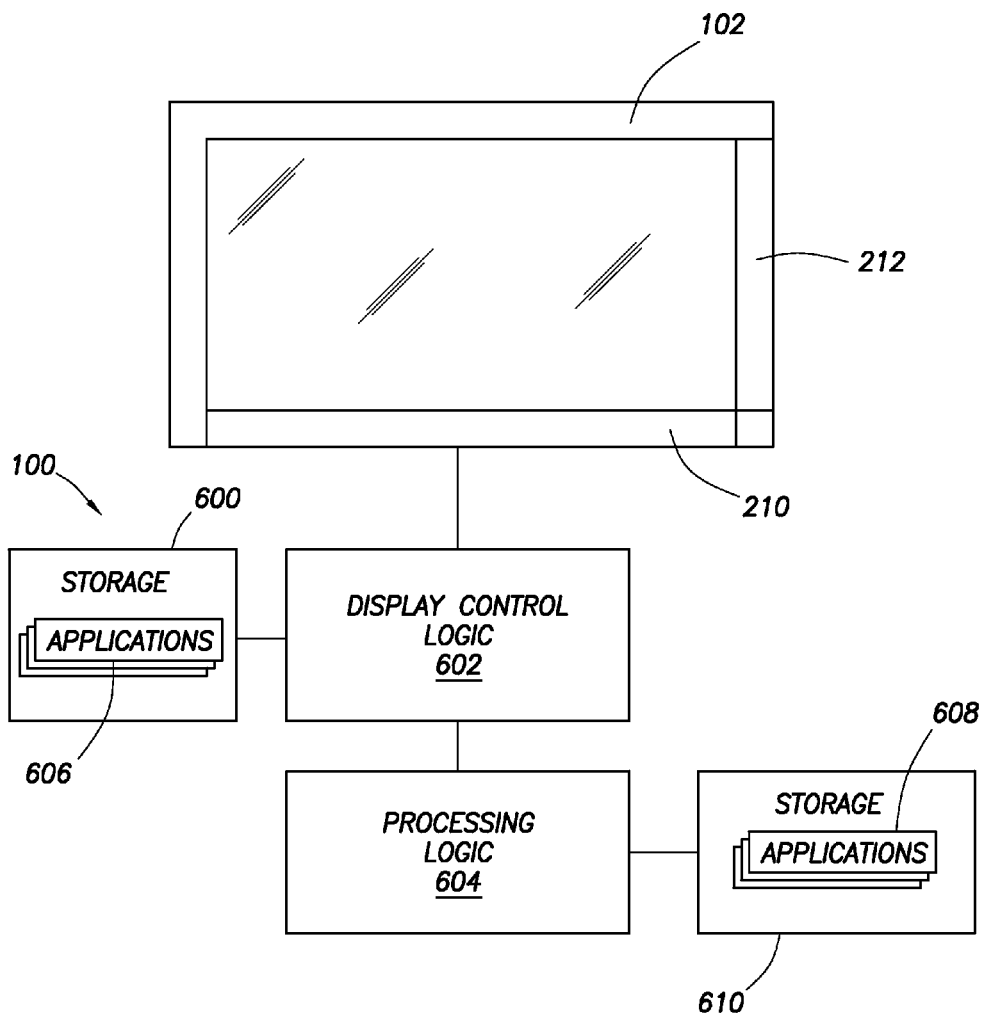
FIG. 6 shows an illustrative block diagram of a system implementing techniques disclosed herein, in accordance with embodiments.

The detectors 210 and light sources 212 couple to circuit logic within the chassis 104 as shown in FIG. 6 and as described further below. The circuit logic in the chassis 104 powers the detectors 210 and light sources 212. The circuit logic also controls the light sources 212 (e.g., switches the light sources on/off) and the detectors 210 (e.g., switches the detectors on/off and receives data from the detectors). In some embodiments, the circuit logic is housed in the display 102 instead of in the chassis 104.

In operation, the light sources 212 emit light, such as infrared laser light. This light is reflected by the mirror pairs 214 and is provided to the glass layer 200. Light waveforms travel within the glass layer 200 as described below. When a user of the computer system 100 touches the display 102 (e.g., using a finger, stylus or other suitable apparatus), the waveforms within the glass layer 200 are disturbed at the point of contact between the glass layer 200 and the finger or stylus. Because light within the glass layer 200 uses total internal reflection, contact with the glass layer 200—or even proximity with the glass layer 200—causes a disturbance in the light patterns within the glass layer 200. Such disturbance is referred to as "frustrated total internal reflection." One of the detectors 210 detects this disturbance and reports it to the circuit logic in the chassis 104 via a notification signal. By determining which light source and which detector correspond to the disturbance, the circuit logic may determine the precise location of the touch on the glass layer 200. The circuit logic then supplies this location information to software applications as desired. This detection technique is now further elucidated.

Figure 3:
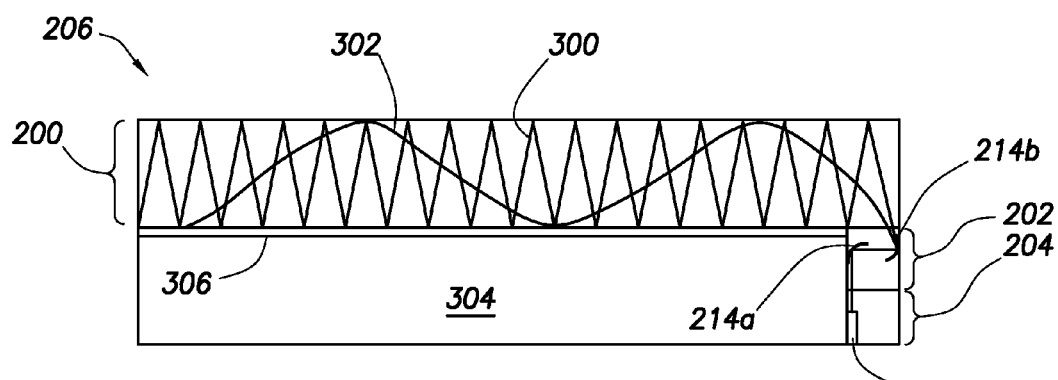
FIG. 3 shows a cross-sectional view of the display of FIG. 2, in accordance with embodiments.

The dashed line 206 in FIG. 2 corresponds to the cross-sectional view of the display 102 shown in FIG. 3. In addition to showing the components of FIG. 2, FIG. 3 shows the aforementioned display surface 304. In at least some embodiments, the glass layer 200 comprises a coating on its surface between the glass layer 200 and the display surface so that the total internal reflection within the glass layer 200 described above is not disturbed, or "frustrated," solely due to proximity with the display surface. The coating may comprise any appropriate, transparent material that has an index of refraction differing from that of the glass layer 200 such that the proximity of the glass layer 200 to the display surface does not frustrate the total internal reflection capability of the glass layer 200.

Figure 5B:
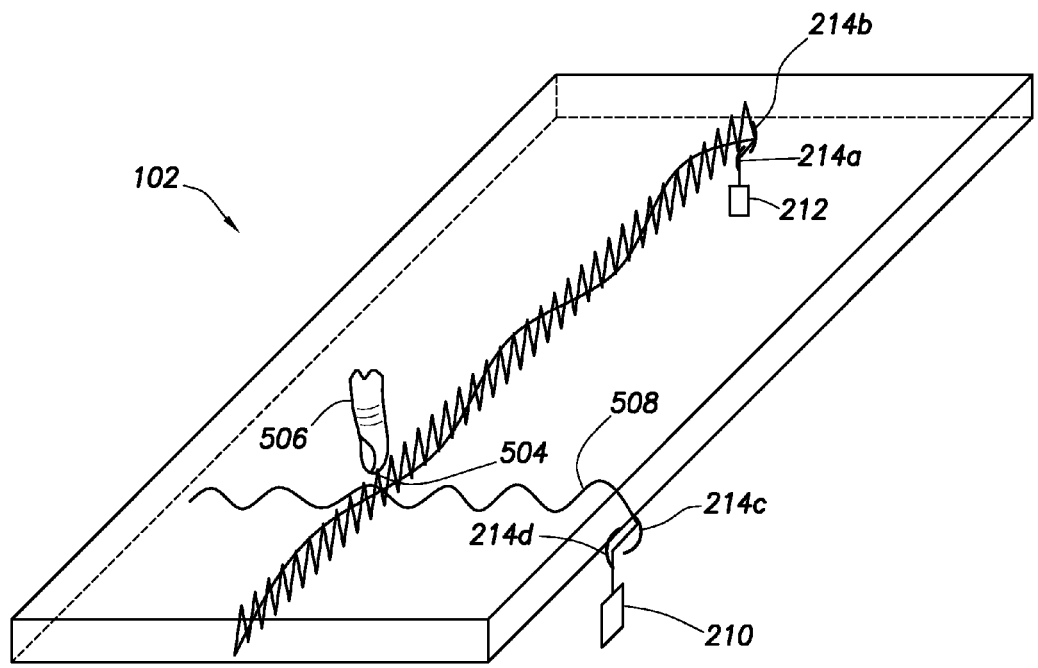
FIG. 5B shows a three-dimensional view of the display of FIG. 2 in operation, in accordance with embodiments.

As shown, in operation, the light source 212 emits light toward the mirror layer 202. The mirror layer 202 comprises a mirror pair 214 that is aligned with the light source 212. The mirror pair 214 comprises two components—a mirror 214a and another mirror 214b. In at least some embodiments, these mirror components are curved. Multiple mirror components facilitate the spread of light throughout the glass layer 200. In particular, the light beam emitted from the light source 212 first strikes the mirror 214a, which reflects the light beam toward the mirror 214b. In turn, the mirror 214b reflects the light beam into the glass layer 200. The mirrors 214a and 214b are angled relative to each other so that, when the mirror 214b reflects the light beam, the light beam is introduced into the glass layer 200 at a range of angles, each of which is less than the critical angle required for total internal reflection to occur. This range of angles is sufficiently broad so as to saturate (i.e., prevents gaps within) the light waveform in the glass layer 200. Specifically, waveforms 300 and 302 are introduced into the glass layer 200. Waveform 300 is representative of light introduced at the critical angle required for total internal reflection. Waveform 302 is representative of light introduced within the desired angular range less than the aforementioned critical angle. The waveform 302 is introduced to saturate, or "fill in," any gaps not covered by the waveform 300. All together, the light entering at angles between those of waveforms 300 and 302 saturate at least a portion of the glass layer 200 with light. In some embodiments, light emitted by a single light source 212 does not saturate the entire glass layer 200, but instead saturates only a portion of the glass layer 200, as shown in FIG. 5B and described below.

Figure 4:
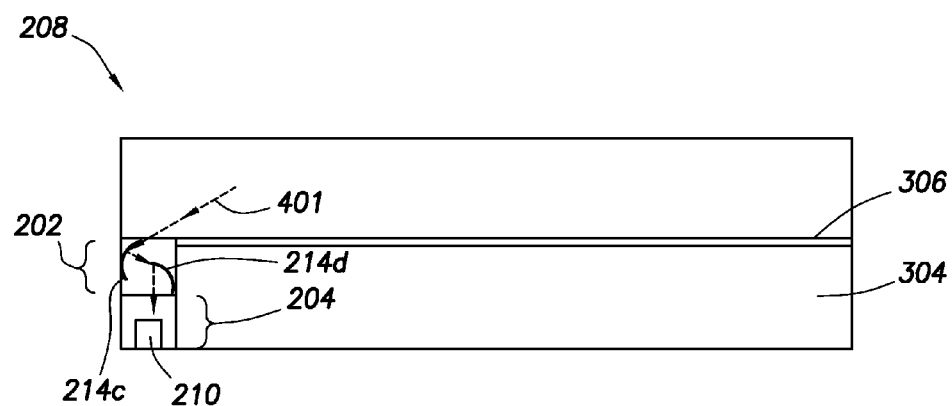
FIG. 4 shows another cross-sectional view of the display of FIG. 2, in accordance with embodiments.

The dashed line 208 in FIG. 2 corresponds to the cross-sectional view of the display 102 shown in FIG. 4. Disturbance of light caused by a touch on the glass layer 200 is shown as the illustrative light beam 401. The mirror layer 202 comprises a mirror pair 214. The mirror pair 214 of FIG. 4 comprises mirror components 214c and 214d. Mirror 214c receives the illustrative light beam 401 and reflects it to mirror 214d. In turn, mirror 214d provides the illustrative light beam 401 to the detector 210. In turn, the detector 210 captures the illustrative light beam and provides data pertaining to the captured light beam to circuit logic in the display 102 and/or chassis 104.

Figure 5A:
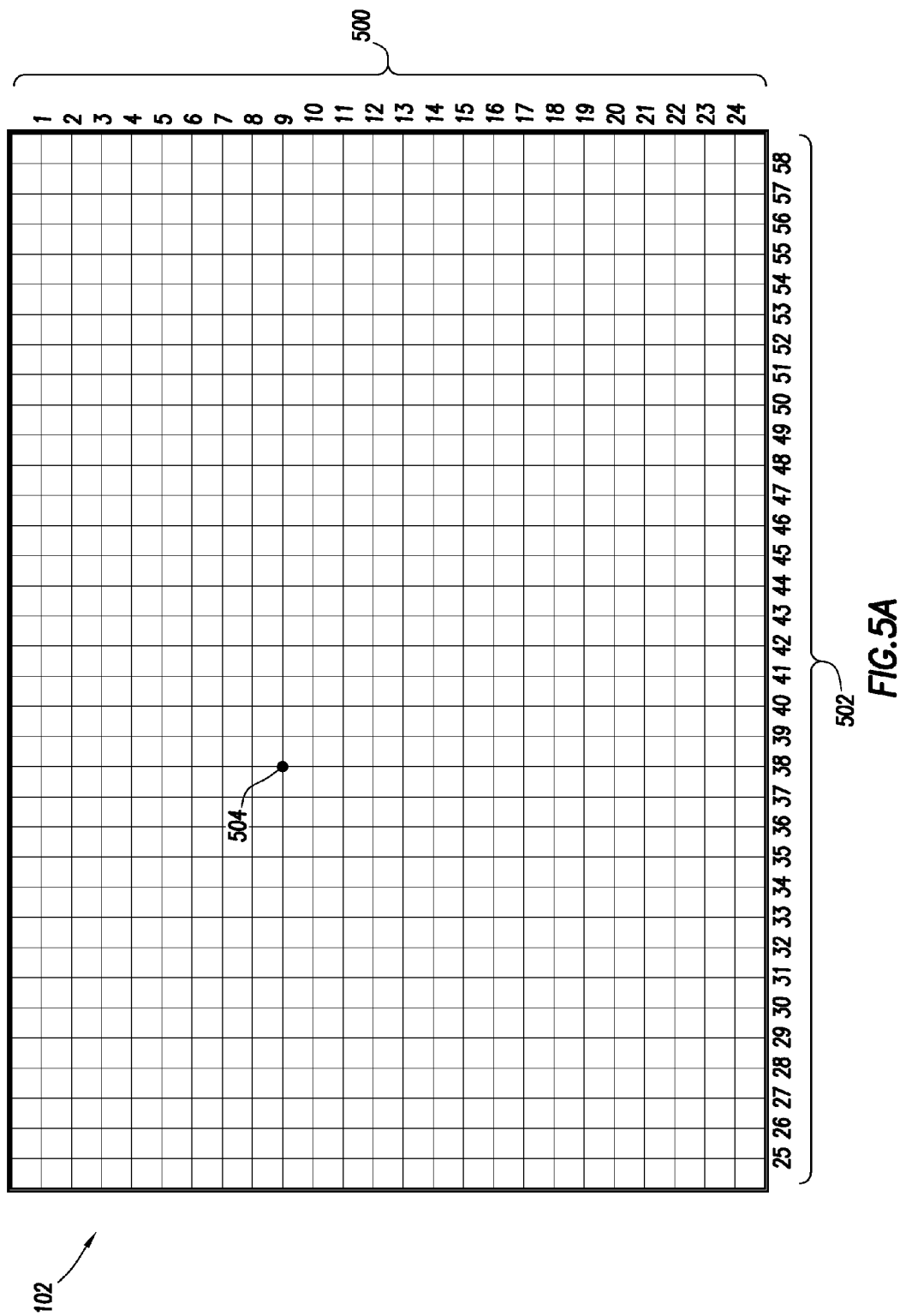
FIG. 5A shows a conceptual illustration of a sensing grid on the display of FIG. 2, in accordance with embodiments.

FIG. 5A shows a conceptual "detection grid" that is formed in the display 102 by the arrangement of the light sources 212 and the detectors 210 as shown in FIG. 2. The illustration of FIG. 5A is a top-down view. Each of the horizontal lines in the conceptual grid represents a discrete light beam that may be emitted by a light source 212. Collectively, these light beams are referred to as an array of light beams 500. For ease of reference and discussion, the light beams are assigned reference numerals 1-24. Each of the vertical lines in the conceptual grid represents a discrete detection path. Light disturbed by a finger or stylus travels along the detection path to a detector 210. Collectively, these detector paths are referred to as an array of detector paths 502. For ease of reference and discussion, the detector paths are assigned reference numerals 25-58.

Referring simultaneously to FIGS. 2 and 5A, in operation, the computer system 100 causes each of the light sources 212 to fire (i.e., emit light and then cease to emit light) in turn. Thus, for example, a light source 212 that corresponds to light beam 1 would fire first, followed by the light source that corresponds to light beam 2, followed by the light source that corresponds to light beam 3, etc. In this way, each of the light sources 212 would fire in turn, so that after the light source 212 associated with light beam 24 fires, the light source 212 that corresponds to light beam 1 would fire again. Stated in another way, the light sources 212 fire in a "round-robin" fashion. The firing period (i.e., the length of time during which a light source emits light) may be any suitable length of time (e.g., approximately less than 1 picosecond–1 millisecond). The delay period (i.e., the length of time between the time a light source ceases emitting light and the time the next light source begins emitting light) also may be of any suitable length (e.g., approximately less than 1 picosecond–1 millisecond). Other speeds also may be used.

Each time a light source is fired, circuit logic that controls the detectors 210 activates each of the detectors 210 in a "round-robin" fashion. For example, while the light source 212 of light beam 1 is fired, each of the detectors 210 is activated and de-activated, so that each path 25-58 is scanned for any light disturbances caused by a display touch. After all detectors paths have been scanned, the light source 212 of light beam 1 ceases firing and, instead, the light source 212 of light beam 2 fires. While the light source 212 of light beam 2 fires, each of the detectors paths 25-58 is again scanned in a round-robin fashion to detect any light disturbances caused by a display touch. This process is continued indefinitely. When a light disturbance is detected by a detector 210, the detector 210 sends a signal to its control logic, notifying the control logic of a possible touch. The detection period (i.e., the length of time during which a detector is activated) may be any suitable length of time (e.g., approximately less than 1 nanosecond–1 second). The detection delay period (i.e., the length of time between the time a detector is shut off and the time the next detector is activated) also may be of any suitable length (e.g., approximately less than 1 picosecond–1 millisecond). Other speeds also may be used. In this way, the light sources 212 and detectors 210 work together to repeatedly "scan" the display 102 for touches. In at least some embodiments, the time needed to "scan" the entire grid shown in FIG. 5A (e.g., less than 1 picosecond–1 second) is less than the minimum amount of time a finger or stylus might spend in contact with or near the glass layer 200 of the display 102 during a touch.

Still referring to FIG. 5A, an illustrative touch point 504 is shown. The touch point 504 is indicative of a location on the display 102 where a finger, stylus, or other apparatus may have been used while interacting with a graphical user interface (GUI) being displayed on the display 102 (e.g., in association with a software application). In operation, after scanning each of the detector paths 25-58 (using detectors 210) during each fire of light sources associated with light beams 1-8, no light disturbances may have been detected. However, when the light source 212 associated with light beam 9 is fired, the touch impressed upon the display 102 at touch point 504 causes the light to be disturbed. When the detector 210 associated with the detector path 38 detects the disturbed light, the detector 210 sends a notification signal to its circuit logic. In turn, the circuit logic determines 1) which detector 210 and 2) which light source 212 were activated at the time of detection. The circuit logic then determines the intersection point on the grid that corresponds to the detection path of that detector and the light beam of that light source. This intersection point is determined to be the touch point. The circuit logic forwards the intersection point to processing logic, software application(s), etc. as necessary.

FIG. 5B illustrates the detection process described above. Light source 212 uses mirrors 214a-b to emit the light beam 9 of FIG. 5A, as shown. A finger 506 touches the display 102 at touch point 504. The finger touch causes light from the beam 9 to be disturbed, or "leaked," shown as disturbed light 508. Using mirrors 214c-d, the detector 210 (corresponding to detection path 38 of FIG. 5A) detects the disturbed light 508. The detector 210 then generates and sends notification signal(s) as described above. Multiple (e.g., simultaneous) touches also may be detected using the above techniques.

FIG. 6 shows the display 102 comprising the light sources 212 and detectors 210. The light sources 212 and detectors 210 couple to display control logic 602. The display control logic 602 controls the light sources 212 and detectors 210 as described above. The display control logic 602 may couple to storage 600, which comprises one or more applications 606. The application(s) 606, when executed, cause the display control logic 602 to perform at least some of the functions described above and may include a background subtraction and/or a calibration. The display control logic 602 may be housed within the computer system chassis 104 or within the display 102. The display control logic 602 couples to processing logic 604. The processing logic 604 handles many of the processing functions of the computer system 100, such as executing operating systems, software applications, etc. The processing logic 604 may execute one or more applications 608 stored on the storage 610 and provide the application(s)

with detected touch information. Touch data received from detectors 210 may be processed by the display control logic 602. In some cases, multiple touches may be received. To ensure that multiple touches are properly interpreted, an application 606 analyzes the timing associated with the touches (e.g., between touches). Although the technique is described herein as being encoded onto the application 606 and executed by the display control logic 602, an application 608 and processing logic 604 also may be used. In some embodiments, other, similar applications and/or processing logic may be used. The technique is now described in detail.

Figure 7:
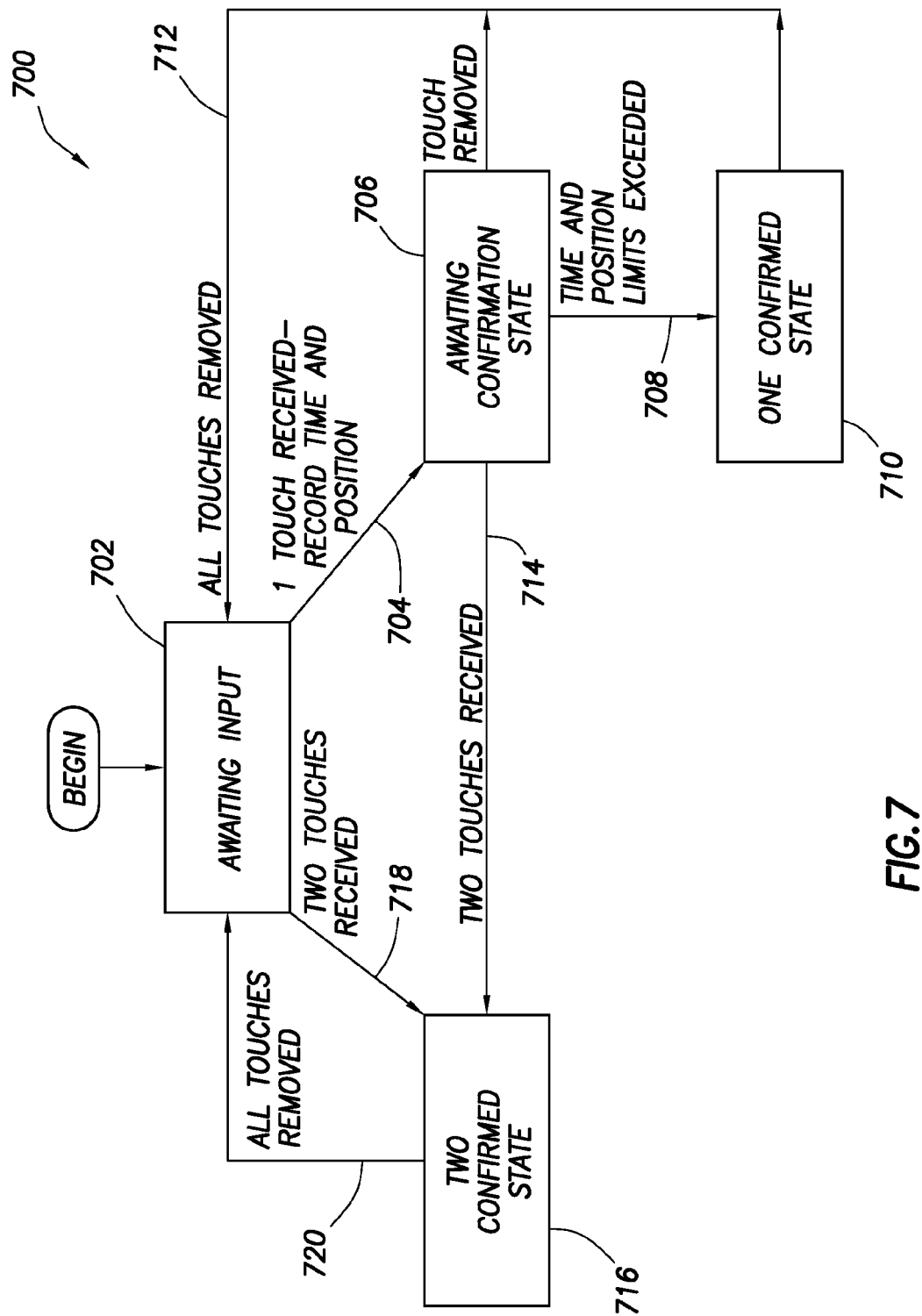
FIG. 7 shows a state diagram of an illustrative method disclosed herein, in accordance with embodiments.

FIG. 7 shows a state diagram of an illustrative method 700 implemented in accordance with embodiments. Referring to FIGS. 6 and 7, the method 700 begins by awaiting input (block 702) in an "awaiting input state." For example, the display control logic 602 may be in an idle or waiting state. If the display control logic 602 detects a single touch on the display 102 (arrow 704), the display control logic 602 records the time and position of the touch (e.g., in a register in storage 600). The display control logic 602 is now in an "awaiting confirmation state" (block 706). Stated in another way, the display control logic 602 has detected a touch and is now waiting to determine whether another touch is to be received. While the display control logic 602 is waiting, it uses an internal counter (not specifically shown) or other mechanism to determine the amount of time that has elapsed since the touch detected at arrow 704. If the amount of time exceeds a predetermined threshold (e.g., preprogrammed into the application 606; arrow 708), or if another touch is detected in a location that exceeds a predetermined distance threshold from the original touch location (e.g., preprogrammed into the application 606; arrow 708), the display control logic 602 confirms that one and only one touch has been received (block 710). Stated in another way, the display control logic 602 enters a "one confirmed state" (block 710) and the position of the touch is recorded. When all touch devices have been removed from the display 102 (arrow 712), the display control logic 602 returns to an "awaiting input state" (block 702).

The predetermined time threshold described above is chosen to allow sufficient leeway for two touches to be detected as simultaneous touches despite the touches having been received at different times. This situation arises when the touches are detected at separate times or when the touches are detected at the same time but then are moved apart (e.g., by spreading the fingers).

If, while in the "one confirmed state," the display control logic 602 detects a second touch, the display control logic 602 may identify which of the two touches is closest to the original touch that was confirmed in the "one confirmed state." The display control logic 602 may designate this identified touch as the original touch. However, the display control logic 602 generally will not transition directly from confirming one touch to confirming two touches.

If, while in the "awaiting confirmation state" (block 706), the display control logic 602 detects a second touch (arrow 714), the display control logic 602 enters a "two confirmed state" (block 716), in which two touches are confirmed and the positions of the touches are recorded. The second touch (arrow 714) must be received within the threshold time frame previously mentioned. The second touch (arrow 714) also must be located in a position that is outside the position threshold previously mentioned. Otherwise, arrow 708 is followed to the "one confirmed state" (block 710).

Another path may be followed to the "two confirmed state" (block 716). If, while in the "awaiting input state" (block 702), the display control logic 602 detects two simultaneous touches (arrow 718), the display control logic 602 enters the "two confirmed state" (block 716). If, while in the "two confirmed state" (block 716), the display control logic 602 determines that all touch devices have been removed from the display 102 (arrow 720), the display control logic 602 returns to the "awaiting input state" (block 702).

While in the "two confirmed state" 716, one of the touches may be removed from the touch screen while the other touch remains. In that case, the display control logic 602 continues to recognize two touches. The display control logic 602 approximates the location of the now-missing touch using vectors. Specifically, the missing touch position will be approximated at the end point of a vector whose origin corresponds to the touch that is still present on the touch screen. The vector maintains the same angle and length as a second vector that is derived from the individual positions of the last two (or more) recorded touch positions. In particular, the origin of the second vector is chosen to be that individual position of the last two (or more) recorded positions that is closest to the received, singular touch position.

The steps of method 700 may be adapted to detect more than two touches. The threshold time frame and position threshold described above are both user-adjustable. All such variations are included within the scope of this disclosure.

Figure 8A:
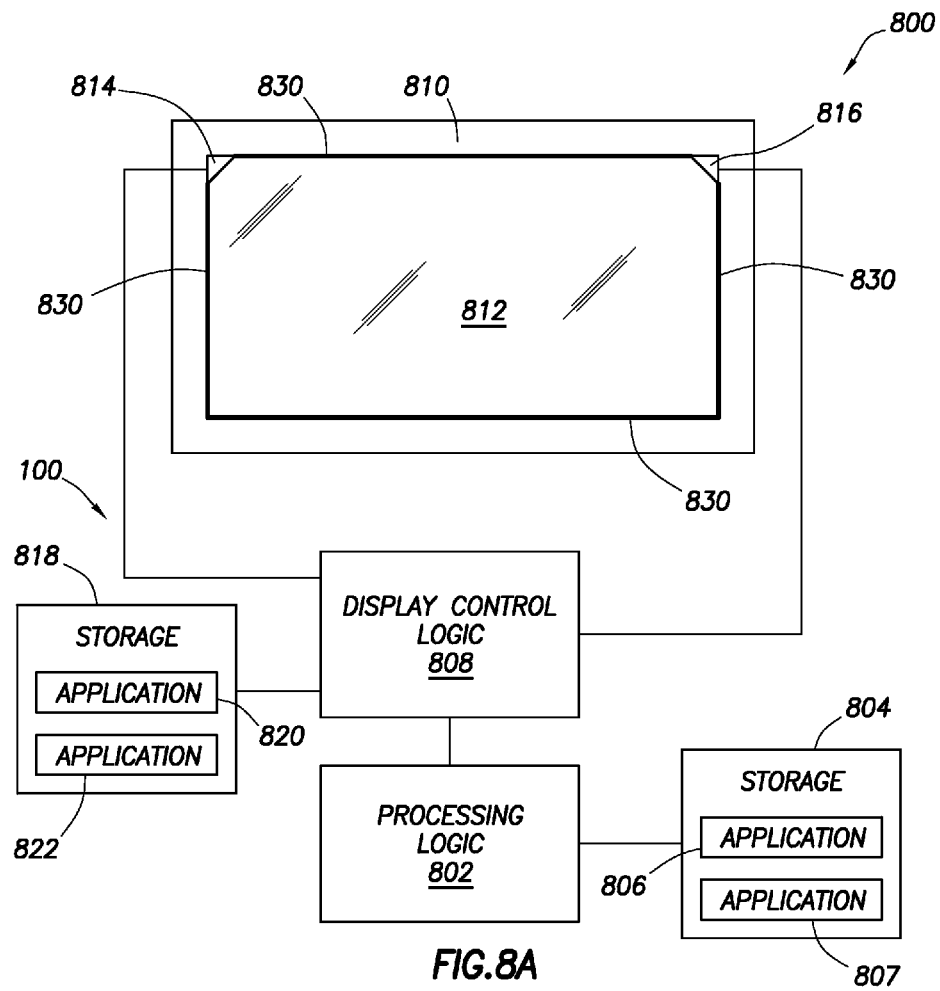
FIG. 8A shows an illustrative block diagram of another illustrative system implementing techniques disclosed herein, in accordance with embodiments.

FIG. 8A shows another system 800 in which method 700 may be implemented. The system 800 comprises processing logic 802, storage 804 that includes applications 806-807, display control logic 808, display 810, touch-screen 812, light transceivers 814 and 816 and storage 818 that includes applications 820 and 822. The touch-screen 812 comprises retro-reflective tape 830, described below, along its edges. The technique of method 700 may be encoded onto software, such as application 806, and executed by the processing logic 802. Alternatively, the technique of method 700 may be encoded onto software, such as application 820, and executed by the display control logic 808. Unlike the system 100, which uses a grid of light sources and detectors to detect touches, the system 800 comprises a plurality of light transceivers 814 and 816 that both transmit light and detect obstructions present on the touch-screen 812.

Figure 8B:
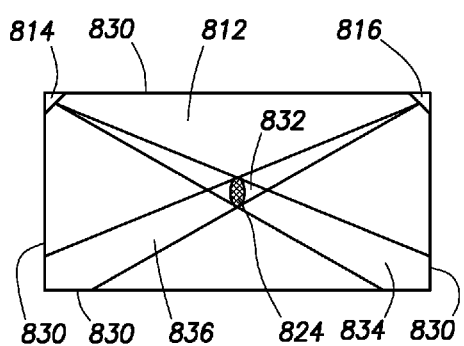
FIGS. 8B-8C show actual touch points and/or phantom touch points as detected by the system of FIG. 8A, in accordance with embodiments.

FIG. 8B shows the system 800 in operation. Assume a user uses a finger to touch the touch-screen 812 at touch point 824. The display control logic 808 causes the light transceiver 814 to emit light (e.g., infrared light) across the touch-screen 812. The retro-reflective tape 830 (e.g., material that comprises a plurality of miniature, mirrored, corner cubes) is disposed along the edges of the touch-screen 812. The retro-reflective tape 830 causes light emitted from the light transceiver 814 to return, or "bounce back," in substantially the same direction (e.g., at substantially the same angle) in which the light arrived at the retro-reflective tape 830. The infrared light may be emitted on either side of the touch-screen 812, as long as a finger or other obstruction is able to obstruct light as described below. The light transceiver 816 operates in a similar manner.

As shown, a touch established at a touch point 824 obstructs light emitted by the light transceivers 814 and 816. Thus, light emitted by the light transceiver 814 strikes the retro-reflective tape 830 and returns to the light transceiver 814, except for light that is blocked by the touch at touch point 824. Similarly, light emitted by the light transceiver 816 strikes the retro-reflective tape 830 and returns to the light transceiver 816, except for light that is blocked by the touch at touch point 824. In this way, each of the light transceivers 814 and 816 determines a path in which an obstruction—such as a finger—lies. A triangulation technique may be used to determine the intersection point 832 of the obstruction paths 834 and 836 determined by the transceivers 814 and 816, thereby identifying the precise location of the obstruction (or touch) at touch point 824.

Figure 8C:
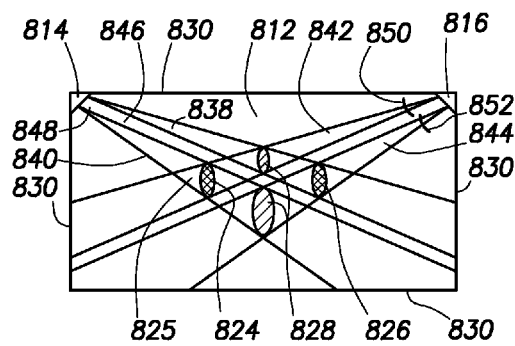

FIG. 8C again illustrates the touch-screen 812, except the touch-screen 812 in FIG. 8C has two touch points 824 and 826. The aforementioned triangulation technique performed by the light transceivers 814 and 816 identifies the touch points 824 and 826. However, unlike the touch-screen shown in FIG. 8B, the touch-screen of FIG. 8O has multiple touch points. As a result, the light transceivers 814 and 816 identify not only the two actual touch points 824 and 826, but they also identify two additional intersection points—called phantom touch points 828 which appear to be actual touch points but, in reality, are not actual touch points. It is desirable to distinguish between actual touch points and phantom touch points, because only actual touch points should be used. The system 800 distinguishes between actual touch points and phantom touch points as now described.

When executed by the display control logic 808, the application 822 causes the display control logic 808 to perform the triangulation technique mentioned above using the light transceivers 814 and 816. When performing the triangulation technique, the display control logic 808 uses the angles of obstruction 846, 848, 850 and 852 that correspond to obstruction paths 838, 840, 842 and 844, respectively, to predict properties of each of the multiple touch points 824, 826 and 828. The display control logic 808 also uses the orientations of the obstruction paths 838, 840, 842 and 844 in relation to the touch screen 812 to predict properties of each of the multiple touch points 824, 826 and 828. Further, the display control logic 808 may maintain additional information pertaining to the light transceivers 814 and 816 corresponding to their locations in relation to the touch screen 812.

Using some or all information collected by the light transceivers 814 and 816, the display control logic 808 determines spatial properties associated with the touch points 824, 826 and 828. Such properties include the touch points' probable size, shape, orientation, etc. The display control logic 808 then may compare the different spatial properties of the touch points 824, 828 and 828 to determine which of the touch points 824, 826 and 828 are most likely to be the actual touch points and which are most likely to be the phantom touch points. The display control logic 808 may perform such comparison by weighting some or all of the spatial properties, using preprogrammed formulas, etc. as desired. Determination of each of the aforementioned spatial properties is now described.

The display control logic 808 may determine the shape of a touch point using the obstruction path angle associated with that touch point in conjunction with the location of the touch point (i.e., using triangulation). For example, because touch points are assumed to be ellipsoid (e.g., because fingers and fingertips tend to resemble ellipses), the display control logic 808 may use optical information, such as the widths of the touch points, from the light transceivers 814 and 816 to determine lengths of the major and minor axes associated with the touch point. Specifically, after the display control logic 808 has used the light transceivers 814 and 816 to determine the location of the touch point whose shape is to be determined, the display control logic 808 uses the obstruction angles corresponding to the touch point, as well as the distance of the touch point from the light transceivers 814 and 816, to determine the length of a major axis of the touch point (i.e., using basic trigonometric techniques). A similar technique may be used to determine the length of a minor axis of the touch point. The display control logic 808 then may determine the difference between the lengths of the major and minor axes and divide by the absolute value of the difference to determine the eccentricity of the ellipsoid touch points. The greater the eccentricity, the more ellipsoid the touch point is. Other, similar techniques may be used to determine shape information of touch points using some or all data gathered by the light transceivers 814 and 816. For example, referring to FIG. 8C, if the shape of the touch point 824 is to be determined, approximations to inscribing an ellipse within the diamond-shaped obstruction 825 may be made.

In some embodiments, the display control logic 808 may be programmed to assume that, of four possible touch points, the two actual touch points and the two phantom touch points will be arranged in an alternating fashion. This assumption is based on the fact that actual and phantom touch points generally tend to be arranged in such an alternating fashion. Thus, for example, referring to FIG. 8C, the touch points are shown in an alternating fashion—the actual touch point 824, followed by one of the phantom touch points 828, followed by the actual touch point 826, followed by another phantom touch point 828. Thus, if the display control logic 808 accurately determines the identity of just one of the possible touch points (i.e., whether the touch point is an actual touch point or a phantom touch point) using any of the techniques described herein, the display control logic 808 may automatically determine the identities of the remaining touch points, since the touch points alternate between actual touch points and phantom touch points. In some such cases, the identity of just one of the possible touch points is immediately, and accurately, determined if the possible touch point is located off of the touch screen 812. A possible touch point that is determined to be off of the touch screen 812 is a phantom touch point, thereby establishing the identities of the remaining possible touch points.

The display control logic 808 may determine the size of a touch point using obstruction path orientations and angles as well as the location information of the light transceivers 814 and 816. As previously mentioned, the display control logic 808 may determine the lengths of the major and minor axes of each of the possible touch points. The display control logic 808 may use these lengths to determine the size (i.e., area) associated with each of the possible touch points. To determine the area of a possible touch point, the display control logic 808 multiplies the product of the major and minor axes by pi. After determining the areas of each of each of the possible touch points, the display control logic 808 may determine the average size of all of the possible touch points. The display control logic 808 then may compare the size of each possible touch point, or sizes of pairs of possible touch points, to the average size of all of the possible touch points to determine which of the touch points are most likely to be the actual touch points and which are most likely to be phantom touch points. In some embodiments, touch points having sizes that closely approximate the average touch point size are more likely to be actual touch points than are touch points whose sizes do not closely approximate the average touch point size. Other, similar techniques also may be used.

The display control logic 808 may determine the orientation of a touch point based on information collected using the light transceivers 814 and 816. Specifically, for each possible touch point, the display control logic 808 determines the obstruction angles associated with that touch point as well as the position of that touch point in relation to the light transceivers 814 and 816. Using this information, the display control logic 808 predicts whether that possible touch point is horizontally or vertically oriented. Assume that the obstruction angle measured by one of the light transceivers (e.g., light transceiver 814) is larger than the obstruction angle measured by the other light transceiver (e.g., light transceiver 816). In such a case, if the display control logic 808 determines that that possible touch point is located closer to the light transceiver 814 than to the light transceiver 816, then—geometrically speaking—the possible touch point is more likely to be horizontally oriented than it is to be vertically oriented. However, if the possible touch point is located closer to the light transceiver 816 than to the light transceiver 814, then the possible touch point is more likely to be vertically oriented than it is to be horizontally oriented. Similarly, assume the obstruction angle measured by the light transceiver 816 is larger than that measured by light transceiver 814. If the possible touch point is located closer to the light transceiver 816 than to the light transceiver 814, the touch point is more likely to be horizontally oriented. Otherwise, the touch point is more likely to be vertically oriented. In general, if the orientation of a possible touch point does not match the orientations of other possible touch points, that possible touch point is likely to be a phantom touch point.

In performing the above determinations, the display control logic 808 may give more or less weight to different factors. For example, the display control logic 808 may give extra weight to determinations made regarding touch point shapes and may give less weight to determinations made regarding touch point orientation. Touch point predictions may be weighted as desired. In some embodiments, after weighting, the predictions may be combined to generate a cumulative value, or prediction, which then indicates which touch points—having taken some or all available information into consideration—are most likely to be actual touch points and which are most likely to be phantom touch points. In some embodiments, the factors described above may be assigned numerical values based on pre-programmed schemes and, after being weighted, may be used in one or more pre-programmed formulas to determine (or predict) which of the possible touches are actual touches and which are phantom touches. In some embodiments, weighting is not performed. Any and all variations on these techniques are encompassed within the scope of this disclosure.

The obstruction path angle information described above is collected by a light transceiver and provided to the display control logic 808 using signals. The display control logic 808 may monitor such signals for changes (e.g., dips) that are indicative of obstruction paths. The display control logic 808 may analyze such changes (e.g., dip width) to determine the angle associated with an identified obstruction path. Other information, such as touch point angle, also may be determined using such signal changes. Having obtained information in this manner, the display control logic 808 may use the factors described above to predict which of the possible touch points are actual touch points and which are phantom touch points. Having predicted which are the actual touch points, the display control logic 808 may forward such predictions to any applicable software that may be running at that time.

In some cases, the two actual touches may not be introduced to the touch-screen 812 at the same time. Stated in another way, one of the touches may be introduced, followed by the second touch at a later time. The system 800 is adapted to distinguish between single touches, multiple touches in series, and multiple simultaneous touches. More specifically, the application 822 is programmed so that when the display control logic 808 detects a first touch on the touch-screen 812, the display control logic 808 waits for a predetermined (e.g., user-specified) length of time before processing the first touch as a mouse-down event. Waiting for this delay time allows for the introduction of a second touch.

This delay may be aborted if the first touch is lifted off of the touch-screen 812. In such a case, the display control logic 808 processes the first touch as a click event. Alternatively, this delay may be aborted if the first touch is moved a predetermined distance from the original location of the first touch, because such a move indicates that the user intends to "drag" an object on the graphical user interface (GUI) of the touch-screen 812. In such a case, the display control logic 808 processes the first touch and drag as a drag event. Further, this delay may be aborted if a second touch is detected on the touch-screen 812. If the delay time expires before a second touch is detected, only a first touch event is processed, and no other touches are processed until all touches are released from the touch-screen 812. Similarly, if a second touch is detected during the delay, the delay then expires and only double touch events are processed until all touches have been lifted off of the touch-screen 812. Other such touch rules may be programmed into the application 822 as desired.

Although the above techniques are generally described as having been performed by the display control logic 808, in some embodiments, the above techniques may be performed by the processing logic 802 while executing the application 807.

Regardless of the type of computer system used (e.g., system 100, system 800 or another system implementing the techniques disclosed herein), touch data collected using the display and the display control logic is subsequently provided to the appropriate application(s) that are being executed. For example, a user of the computer system might see a GUI on the display. The GUI is generated using an application. The user interacts with the GUI by touching the display. The display control logic collects this touch information and provides it to the application that was used to generate the GUI with which the user was interacting.

Figure 9:
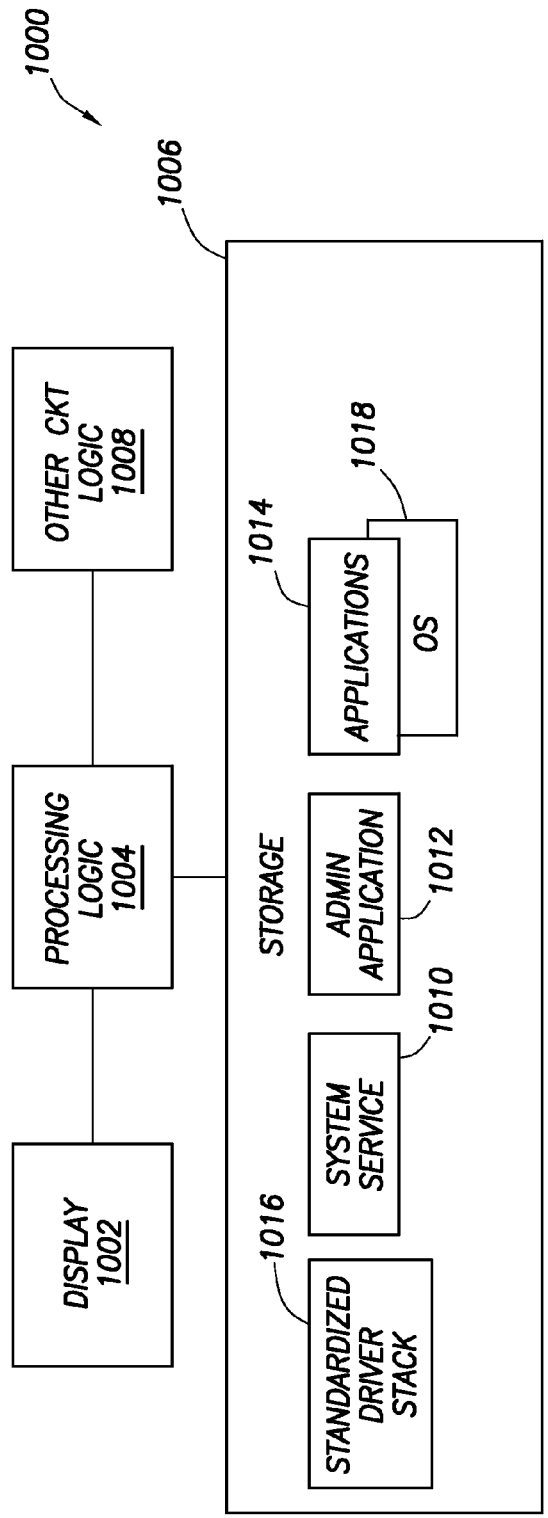
FIG. 9 shows an illustrative block diagram of a generic computer system implementing techniques disclosed herein, in accordance with embodiments.

FIG. 9 shows a generic computer system 1000 (e.g., illustrative of systems 100 and/or 800) comprising software architecture that collects and routes touch data appropriately. The computer system 1000 comprises a touch-screen display 1002, processing logic 1004, storage 1006 and other circuit logic 1008 (e.g., video cards, buses). The storage 1006 comprises a system service application ("SS") 1010 and an administration application ("AA") 1012. The storage 1006 also comprises one or more generic user applications 1014 and a standardized driver stack ("SDD") 1016. The SS 1010 may be defined as a program that operates to accept input from hardware and to provide that input to the operating system and/or an administration application (AA). The AA 1012 may be defined as a program that accepts input from the system service application and provides that input to the operating system and/or cooperating applications on a per user basis. The SDD 1016 may be defined as a set of programs intended to interpret input from cooperating hardware and to present it to applications in a uniform manner independent of implementation. The applications 1014 include an operating system ("OS") 1018, such as the WINDOWS® VISTA® OS. When software stored on the storage 1006 is described herein as performing an action, it is understood that the processing logic 1004 actually performs that action as a result of executing the software.

The SS 1010 is initiated upon boot-up of the OS 1018. The SS 1010 receives information from and transfers information to the display 1002 via the SDD 1016. When no user is logged in to the system 1000, the SS 1010 configures the display 1002 accordingly (e.g., with a log-in screen). As each of a plurality of users logs in, a separate instance of the AA 1012 is initiated and executed by the processing logic 1004. When the SS 1010 receives touch data from the display 1002, the SS 1010 routes the touch data to the instance of the AA 1012 that corresponds to the user who is currently logged in and currently active. The touch data is transferred using any suitable/appropriate methods of interprocess communication. In turn, the AA 1012 instance that receives the touch data analyzes the touch data to determine how the touch data should be further routed. In some embodiments, if the AA 1012 determines that the touch data includes only a single touch, the AA 1012 provides the single touch to the OS 1018 for default, or "normal," processing. However, in some embodiments, if the AA 1012 determines that the touch data includes multiple touches, the AA 1012 provides the touch data to applications 1014 presently running that may make use of multiple touch data for purposes such as expand, contract, grab and drag operations. Many variations on this type of routing are possible. All such variations are included within the scope of this disclosure.

The SS 1010 determines to which instance of the AA 1012 touch data should be routed based on user context information received from the instances of the AA 1012. The user context information provided by each instance of the AA 1012 indicates a status of the user associated with that instance. For example, the user context information may indicate that a user is currently logged in; that the user is currently logged in but inactive; that the user is currently logged in and active; that a screen saver is running, etc. User context information may be programmed to include any such information, as desired.

As previously explained, the user context information may be used to route received touch data to the proper instance of the AA 1012 (e.g., the instance corresponding to a logged-in and active user). However, the user context information also facilitates data transfer in the opposite direction. Specifically, the SS 1010 may use the user context information to configure the touch screen display 1002 in accordance with user preferences. For instance, if a particular instance of the AA 1012 corresponds to a currently logged-in, active user, the SS 1010 will configure the touch screen display 1002 in accordance with that user's preferences. Each user's preferences may be stored on storage 1006—in the form of a database, for example.

Figure 10:
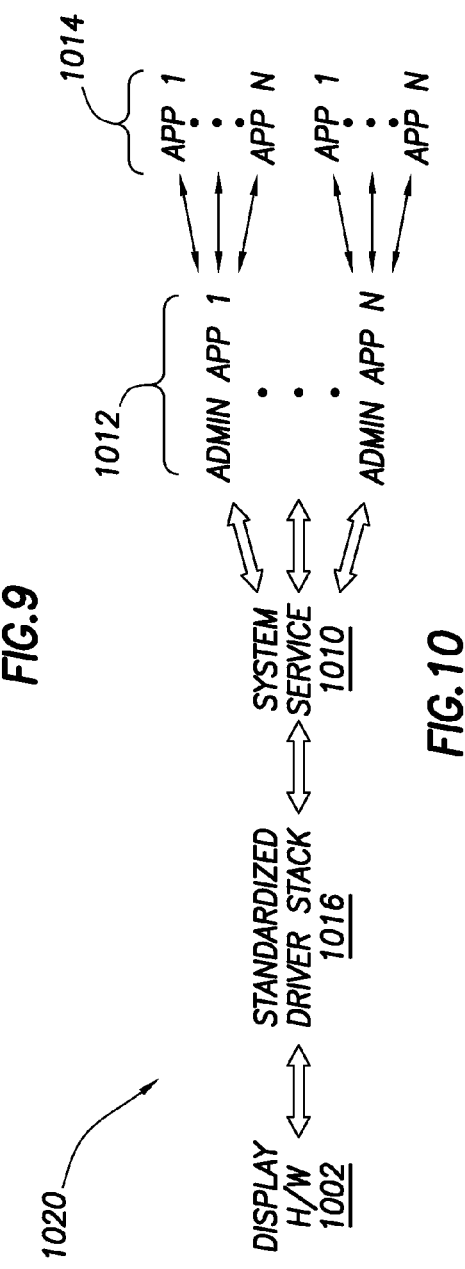
FIG. 10 shows a conceptual illustration of software architecture implemented in the generic computer system of FIG. 9, in accordance with embodiments.

FIG. 10 shows a conceptual illustration 1020 of the software architecture described above. As shown, the display hardware 1002 (which includes display control logic) communicates with the SDD 1016. In turn, the SDD 1016 communicates with the SS 1010. When the SS 1010 receives touch data from the display hardware 1002 via the SDD 1016, the SS 1010 routes the touch data to one of the (potentially) multiple instances of the AA 1012 that may be running on the system 1000. The AA 1012 instance to which the touch data is routed depends on user context information received from the instance(s) of the AA 1012 (e.g., depending on which user is currently logged in and active on the system 1000 at the time). For example, if a user is presently active, the SS 1010 routes the touch data to that user's instance of the AA 1012. Each of the multiple instances of the AA 1012 may communicate with one or more applications 1014, as shown. Thus, an instance of the AA 1012 that receives touch data may route the touch data to one of the applications 1014 that is currently in use (e.g., the "active" or "topmost" application). In some embodiments, the instance of the AA 1012 that receives the touch data routes the touch data to an OS 1018, which is one of the applications 1014. Data is generally routed from the AA 1012 instance to the OS 1018 when the touch data includes only a single touch. If the touch data includes a double touch, the instance of the AA 1012 provides the touch data to appropriate application(s) 1014 that may use multiple touch data (e.g., for window expansion or contraction, drag events). However, various such routes are possible and are included within the scope of this disclosure.

As previously explained, the SS 1010 may use the SDD 1016 to configure parameters on the display 1002 in accordance with whichever instance of the AA 1012 that may be running at the time. The SS 1010 may further configure parameters on the display 1002 in accordance with whichever applications 1014 that may be running at the time (in association with the particular instance of the AA 1012 that is running at the time).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of light sources configured to provide light beams to a waveguide layer of a touch-screen, at least one of said light beams is disturbed when an object touches the touch-screen at a touch point;
   a plurality of detectors, at least one of the detectors configured to detect said disturbed light; and
   control logic coupled to the at least one detector, the control logic determines a location of said touch point as a result of said at least one detector detecting said disturbed light;
   wherein the plurality of light sources and plurality of detectors are contained within a source/detector layer, the source/detector layer is separated from the waveguide layer by a mirror layer comprising a plurality of mirrors that transfer light between the source/detector layer and the waveguide layer.

2. The system of claim 1, wherein at least some of the plurality of light sources comprise infrared laser diodes.

3. The system of claim 1, wherein said control logic determines said location by determining which of the plurality of light sources emitted the light beam that was disturbed.

4. The system of claim 1, wherein the plurality of light sources is arranged along a different side of the source/detector layer than the plurality of detectors.

5. The system of claim 1, wherein said disturbed light comprises light dispersed from a light beam emitted by one of said plurality of light sources.

6. The system of claim 1, wherein the plurality of light sources is disposed adjacent to a side of the touch-screen that is orthogonal to another side of the touch-screen adjacent to which said plurality of detectors is disposed.

7. The system of claim 1, wherein an interval between adjacent light sources is between 0.01 mm and 10 mm.

8. The system of claim 1, wherein each of the plurality of light sources is associated with a mirror pair comprising two components, and wherein the mirror pair transfers a light beam from a light source to said touch-screen, the mirror pair spreads the light beam into a range of angles when providing the light beam to the touch-screen.

9. The system of claim 1, wherein, while a first one of the plurality of light sources is activated, each of the plurality of detectors is activated and deactivated, and wherein, while a second one of the plurality of light sources is activated, each of the plurality of detectors is activated and deactivated, the second one of the plurality of light sources is activated while the first one of the plurality of light sources is deactivated.

10. The system of claim 1, wherein all of the plurality of light sources and all of the plurality of detectors are activated within 100 milliseconds.

11. A system, comprising:
a first layer capable of guiding light waves;
a second layer adjacent to the first layer, the second layer comprises multiple reflective devices;
a third layer adjacent to the second layer, the third layer comprises multiple light sources and multiple detectors, the light sources arranged on one or more of a pair of sides of the third layer and the detectors arranged on one or more of another pair of sides of the third layer; and
control logic coupled to the multiple detectors;
wherein each of the light sources is activated so that light passes from that light source to the first layer via one of the multiple reflective devices, each of the light sources is activated and deactivated in a round-robin fashion;
wherein, while each of the light sources is activated, each of the multiple detectors is activated and deactivated in a round-robin fashion;
wherein, as a result of one of the multiple detectors detecting light, the control logic determines by which of the multiple light sources the detected light was generated.

12. The system of claim 11, wherein said one of the multiple detectors detects said light reflected as a result of frustrated total internal reflection to the first layer at a location that corresponds to said one of the multiple detectors and the light source that generated said detected light.

13. The system of claim 11, wherein the pair of sides is orthogonal to the another pair of sides.

14. The system of claim 11, wherein a total amount of time for each of the multiple light sources to be activated and deactivated in a round-robin fashion, and for each of the multiple detectors to be activated and deactivated in a round-robin fashion, is less than 100 milliseconds.

15. The system of claim 11, wherein said light that passes from the light source to the first layer via one of the multiple reflective devices travels through said first layer in a light beam that runs parallel to said another pair of sides.

16. The system of claim 11, wherein the system comprises a system selected from the group consisting of a display, a television, a desktop computer system, a mobile communication device, a personal digital assistant and a portable music player.

17. A method, comprising:
generating a light beam that propagates along a length of a display using total internal reflection;
frustrating the total internal reflection of the light beam so as to leak at least part of said light beam;
activating and deactivating each of a plurality of detectors until one of said detectors detects a reflected portion of said leaked light; and
using a location of the detector that detects said reflected portion of the leaked light and a location of a light source that generated said light beam, determining one or more locations at which said total internal reflection of the light beam was frustrated.

18. The method of claim 17, wherein generating said light beam along said length comprises using the light source to generate said light beam, providing said light beam to a pair of mirrors, and introducing said light beam from the pair of mirrors into the display, said display comprises a layer of glass capable of guiding waveforms.

19. The method of claim 17 further comprising providing said one or more locations to a processor that is executing an application and that is displaying a graphical user interface (GUI) associated with said application.

20. The method of claim 17, wherein generating said light beam comprises using infrared laser diodes.

21. A system, comprising:
a light source and detector layer (LSDL) comprising a plurality of light sources disposed along at least one of a pair of sides of the LSDL and further comprising a plurality of detectors disposed along at least one of another pair sides of the LSDL;
a mirror layer adjacent to said LSDL, the mirror layer comprising multiple mirror pairs, at least one of said multiple mirror pairs aligned with one of the plurality of light sources, at least another one of said mirror pairs aligned with one of the plurality of detectors; and
a glass layer adjacent to said mirror layer, the glass layer at least partially separated from the LSDL by the mirror layer.

22. The system of claim 21, wherein the plurality of light sources are aligned with a single mirror pair that reflects light emitted from the plurality of light sources into the glass layer.

23. The system of claim 21, wherein the plurality of detectors are aligned with a single mirror pair that reflects light from the glass layer to said plurality of detectors.

24. The system of claim 21, wherein the plurality of light sources are spaced between 1 mm and 10 mm apart.

25. The system of claim 21, wherein the system comprises a computer display.

* * * * *